(12) United States Patent
Kim

(10) Patent No.: US 11,682,753 B2
(45) Date of Patent: Jun. 20, 2023

(54) LITHIUM FOIL LAMINATION APPARATUS FOR ANODE MATERIAL OF LI-METAL BATTERY

(71) Applicant: Young Hwan Kim, Incheon (KR)

(72) Inventor: Young Hwan Kim, Incheon (KR)

(73) Assignee: Young Hwan Kim, Incheon (KR)

( * ) Notice: Subject to any disclaimer, the term of this patent is extended or adjusted under 35 U.S.C. 154(b) by 0 days.

(21) Appl. No.: 17/955,177

(22) Filed: Sep. 28, 2022

(65) Prior Publication Data
US 2023/0143996 A1    May 11, 2023

(30) Foreign Application Priority Data
Nov. 11, 2021  (KR) ........................ 10-2021-0154913

(51) Int. Cl.
*H01M 4/04* (2006.01)
*H01M 10/0525* (2010.01)
*H01M 10/04* (2006.01)

(52) U.S. Cl.
CPC ....... *H01M 4/0404* (2013.01); *H01M 4/0435* (2013.01); *H01M 10/0404* (2013.01); *H01M 10/0525* (2013.01)

(58) Field of Classification Search
None
See application file for complete search history.

(56) References Cited

FOREIGN PATENT DOCUMENTS

| CN | 1218579 | * | 9/2005 | ............. H01M 4/12 |
|----|---------|---|--------|------------------------|
| CN | 211700427 U | | 10/2020 | |
| JP | H10228900 A | | 8/1998 | |
| JP | 2018142528 | * | 9/2018 | .......... H01M 10/052 |
| JP | 2018147836 | * | 9/2018 | ............ H01M 4/139 |
| JP | 2018190692 | * | 11/2018 | .......... H01M 10/052 |
| KR | 1020160085023 A | | 7/2016 | |
| KR | 1020200018259 A | | 2/2020 | |

* cited by examiner

*Primary Examiner* — Jonathan Crepeau
*Assistant Examiner* — Angela J Martin
(74) *Attorney, Agent, or Firm* — Rabin & Berdo, P.C.

(57) ABSTRACT

A lithium foil laminating apparatus for an anode material of a lithium metal battery comprises a pair of lithium foil unwinders; a pair of tension guide rolls; a pair of horizontal guide rolls; a pair of first release film winders; a copper foil unwinder; a copper foil tension regulator; a pair of lithium foil cutters; a pair of guide plates; a pair of guide rolls; a pair of press rolls; a first release film unwinder; and an anode material winder.

6 Claims, 5 Drawing Sheets

LITHIUM FOIL LAMINATION APPARATUS FOR ANODE MATERIAL OF LI-METAL BATTERY

BACKGROUND OF THE INVENTION

1. Field of the Invention

The present invention relates to a lithium foil laminating apparatus for anode material of a lithium metal battery, and more particularly, to an apparatus for laminating lithium foil on both sides of a copper foil by a two-stage press roll.

2. Description of Related Art

Lithium-ion batteries are generally composed of a cathode, an anode, an electrolyte, and a separator. The cathode is a source of lithium ions and determines a capacity and a voltage of the battery. The anode reversibly absorbs and releases lithium ions from the cathode while allowing current to flow through an external circuit, and a graphite with a stable structure is mostly used for the anode. The electrolyte acts as a medium to move lithium ions between the cathode and the anode, and a material with high ionic conductivity is used for the electrolyte. The separator physically blocks the anode and cathode so that they do not mix with each other, allowing only lithium ions to move.

The anode determines a life and capacity of the battery. In the beginning, lithium metal was directly used for the anode, but due to instability of the lithium metal, a stable graphite material with a layered structure has been used so far. Although silicon material is attracting attention, research is needed to stabilize the silicon material due to expanding 3 to 4 times more than the graphite material.

The manufacturing process of the lithium-ion batteries is largely divided into electrode process, assembly process, and chemical conversion process, and the detailed process differs for each battery type and manufacturer.

The electrode process is a process of making cathode and anode plates, and is performed of mixing, coating, pressing, and slitting on a current collector substrate using a mixture in which a cathode/anode active material, a conductive material, and a binder are mixed together, and the cathode and anode manufacturing processes are carried out respectively.

The assembly process is a process of assembling the cathode and anode plates made through the electrode process according to a cell shape with the separator. The assembly process is performed of notching, stacking, tab welding, and packaging, and the electrode plates are stacked by winding or stacking as much as the capacity of a cell.

The notching process is a process of cutting the electrode plate to an appropriate size according to the shape of the battery in order to manufacture tabs for the cathode and anodes, and it influences the production speed of the battery.

The notching process is performed by a press or a laser apparatus, and the press apparatus with a sharp press blade cuts a roll-type cathode/anode plate directly up and down so periodic blade replacement and maintenance are required. The laser apparatus cuts using an IR laser, so there is no additional maintenance cost and the production speed is fast, but the initial investment cost is high.

After the notching process is completed, the electrode plates are wound or stacked by stacking according to the shape of the cell such as cylindrical, prismatic, pouch type in order to obtain a desired cell capacity.

The chemical conversion process is a process for activating and stabilizing a lithium-ion battery. It charges/discharges an assembled battery to give it electrical characteristics, and performs quality inspection and selection of the battery.

After the notching process, the stacking process includes a method of notching and stacking with a laser, or a method of stacking after notching using a mold.

As a next-generation battery, lithium metal batteries that use lithium metal as the anode can increase their energy density to more than 1,000 Wh/L, which is higher than 800 Wh/L of lithium-ion batteries, so R&D is being concentrated.

The lithium metal itself is soft and sticky, and there is a problem in that it sticks to each other or foreign substances stick to the lithium metal, so it is difficult to make a lithium foil of less than 100 um. In a punching or notching process using a mold, a sticky phenomenon in which the lithium metal is stained on the mold occurs, causing a defect and degrading productivity. In addition, when the lithium metal is stored in a magazine after notching, there is a problem in that the anode sticks to each other under pressure due to its own weight. In order to solve the above problem, if the load is small enough that it does not stick, there is a problem that productivity is lowered due to frequent magazine replacement.

Therefore, in order to use a metallic lithium as an anode material, it is necessary to prevent it from sticking to rollers in the pressing process for making lithium foil, a special manufacturing process is required to prevent it from sticking to the mold in the notching process, and the magazine storage process must be omitted.

In the electrode process, the lithium metal of the anode material uses a lamination technique that presses lithium foil as an active material on both sides of the current collector which is copper foil. In the pressing process, if a steel roll with strong hardness is used for both rolls of the press, lamination is not performed well, and there is a problem in that poor lamination occurs such as sticking to the roll or tearing. In addition, there is a problem in that the lithium foil is detached due to the stickiness of lithium and a mismatch with the pattern formed on the copper foil occurs.

SUMMARY OF THE INVENTION

In order to solve the above problems, the present invention is to provide a lithium foil laminating apparatus that solves defects that occur when laminating a sticky lithium foil on a copper foil current collector and improves productivity.

A lithium foil laminating apparatus for an anode material of a lithium metal battery according to the present invention for the above-mentioned problem comprises a pair of lithium foil unwinders for unwinding lithium foils wound together with release films; a pair of tension guide rolls for minimizing tension fluctuations of unwound lithium foils; a pair of horizontal guide rolls for horizontally guiding the unwound lithium foils passed through the tension guide rolls; a pair of first release film winders for winding release films removed from the lithium foil unwinders; a copper foil unwinder for unwinding a patterned current collector; a copper foil tension regulator for changing a direction downward by adjusting a tension of an unwound copper foil; a pair of lithium foil cutters for cutting the lithium foils that have passed through the horizontal guide rolls to a predetermined length; a pair of guide plates for guiding cut lithium foils to guide rolls; a pair of guide rolls for guiding the cut lithium foils on both sides of a patterned copper foil; a pair of press rolls for laminating the cut lithium foils to both sides of the patterned copper foil; a first release film unwinder for inserting a release film into a laminated anode material; and an anode material winder for winding the laminated anode material into which the release film is inserted, wherein the lithium foil unwinders, the tension guide rolls, the horizontal guide rolls, the first release film winders, the lithium foil unwinders, the lithium foil cutter, the guide plates, the guide rolls and the press rolls are formed symmetrically left and right in pairs, and the pair of guide rolls and the pair of press rolls are a two-stage structure with guide rolls formed on an upper part.

DETAILED DESCRIPTION OF THE INVENTION

The present invention uses lithium metal as an anode material and is collectively referred to as a 'lithium metal (Li-metal) battery' in order to distinguish it from a 'lithium ion (Li-ion) battery' using conventional graphite or the like as an anode material.

A lamination technology of the present invention is a technology of simultaneously attaching lithium metal foils to both sides of a current collector, which is a copper foil. To facilitate bonding, a primer ink containing carbon is coated on the copper foil in a pattern at a predetermined interval, and the lithium metal foil is applied. press with a press.

If a steel roll with strong hardness is used for both rolls of the press, defective products are generated due to sticking or torn to the steel roll, and there is a problem in that productivity is lowered by stopping the operation to solve the problem.

Figure 1:
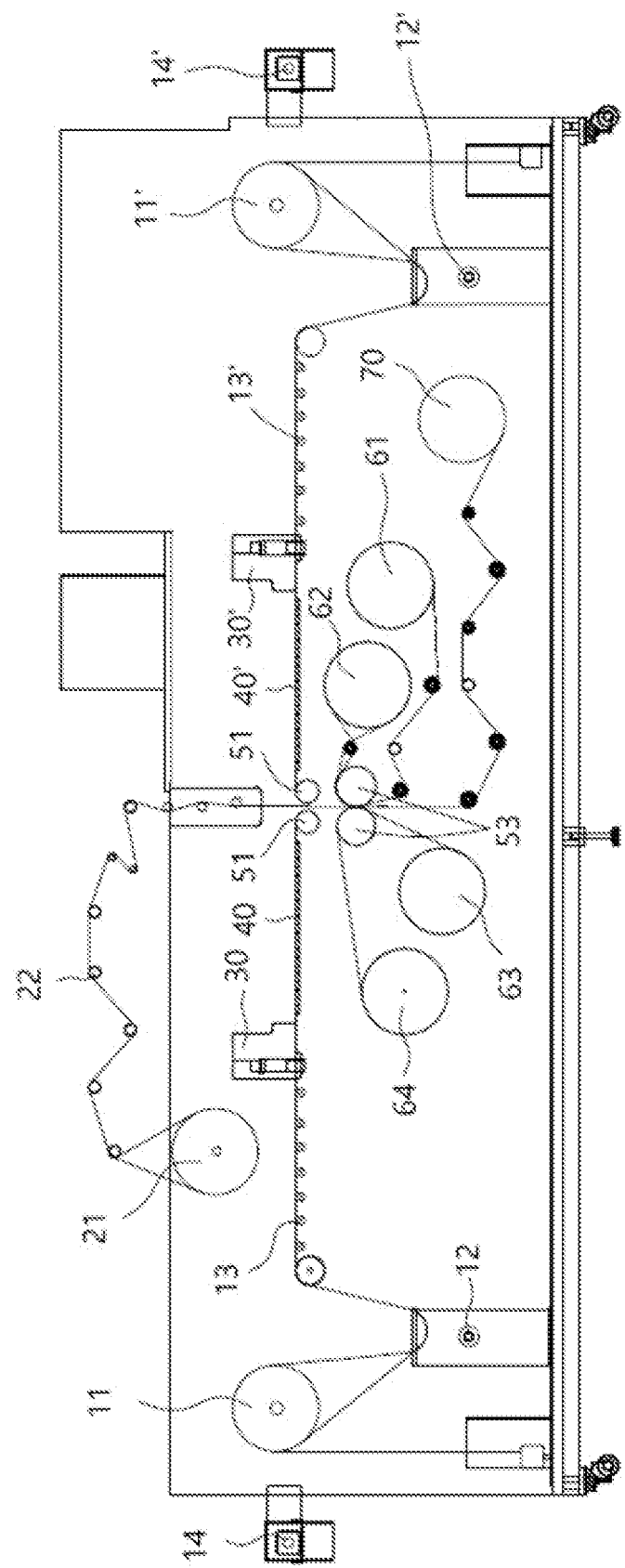
FIG. 1 is a perspective view of a lithium foil laminating apparatus according to the present invention.

FIG. 1 is a perspective view of a lithium foil lamination apparatus according to the present invention. The lithium foil lamination apparatus comprises a pair of lithium foil unwinders 11, 11' for unwinding a lithium foil wound together with a release film; A pair of tension guide rolls 12, 12' for minimizing tension fluctuations of an unwound lithium foil; A pair of horizontal guide rolls 13, 13' for guiding the lithium foil passed through the tension guide rolls horizontally; a pair of first release film winders 14, 14' for winding the release film removed from the lithium foil unwinder; Copper foil unwinder 21 for unwinding a patterned current collector; a copper foil tension regulator 22 for changing a direction downward by adjusting a tension of a unwound copper foil; A pair of lithium foil cutters 30, 30' for cutting the lithium foil passed through a horizontal guide rolls to a predetermined length; A pair of guide plates 40, 40' for guiding a cut lithium foil to the guide rolls; A pair of guide rolls 51 for guiding to laminate the cut lithium foils on both sides of the patterned copper foil; A pair of press rolls 53 for laminating the lithium foil to a patterned copper foil; It includes a first release film unwinder 60 for inserting a release film into a laminated anode material; and an anode material winder 70 for winding the anode material into which the release film is inserted.

In addition, the lithium foil lamination apparatus comprises a pair of second release film unwinders 61, 63 supplying a release film surrounding the press roll that compresses the lithium foil so that the lithium foil does not stick to the pair of press rolls 53 and the release film wrapped around the press roll. It includes a pair of second release film winders 62, 64 for winding the release film.

Since the lithium foil lamination apparatus of the present invention attach lithium foils to both sides of the copper foil as a current collector, lithium foil unwinders 11, 11 ', tension guide rolls 12, 12', horizontal guide rolls 13, 13', first release film winders (winder, 14, 14'), lithium foil cutters 30, 30', guide plates 40, 40', guide rolls 51, and press rolls 53 are composed symmetrically in pairs.

Since the lithium foils stick to each other due to the sticky properties of the lithium foil, the release film is inserted between the lithium foils for easy removal and wound up. The lithium foil unwinders 11, 11' unwinds wound lithium foils into which the release films are inserted, and the release films proceed to the first release film winders 14, 14', and the unwound lithium foils proceed to the tension guide rolls 12,12'.

The tension guide rolls 12, 12' adjust the tension while moving up and down by their own weight of rolls in order to minimize the tension fluctuations in response to a sudden tension disturbance.

The horizontal guide rolls 13, 13' are composed of a plurality of rolls and are maintained to move smoothly before entering the lithium foil cutter.

The copper foil unwinder 21 is a component which unwinds the copper foil which is an anode current collector. The copper foil is patterned with carbon coated on both sides at predetermined intervals of about 60 cm so that the lithium foil can be easily attached. The carbon coating can be used as a primer for conductive inks or adhesives.

In the present invention, since the lithium foil is not continuously laminated on the copper foil, but only the copper foil of the patterned portion is laminated discretely, the degree of matching of the pattern influences the production quality. If the pattern of the copper foil and the lithium foil are mismatched or bubbles are generated, it is discarded as a defective product and the yield is lowered, thereby lowering productivity.

The copper foil tension controller 22 adjusts the tension of an unwound copper foil to change the direction downward. The lithium foils are simultaneously attached to both sides of the copper foil proceeding vertically downward.

The lithium foil cutters 30, 30' cut the lithium foils passing through a horizontal guide rolls to a predetermined length to match the patterned copper foil.

Figure 2:
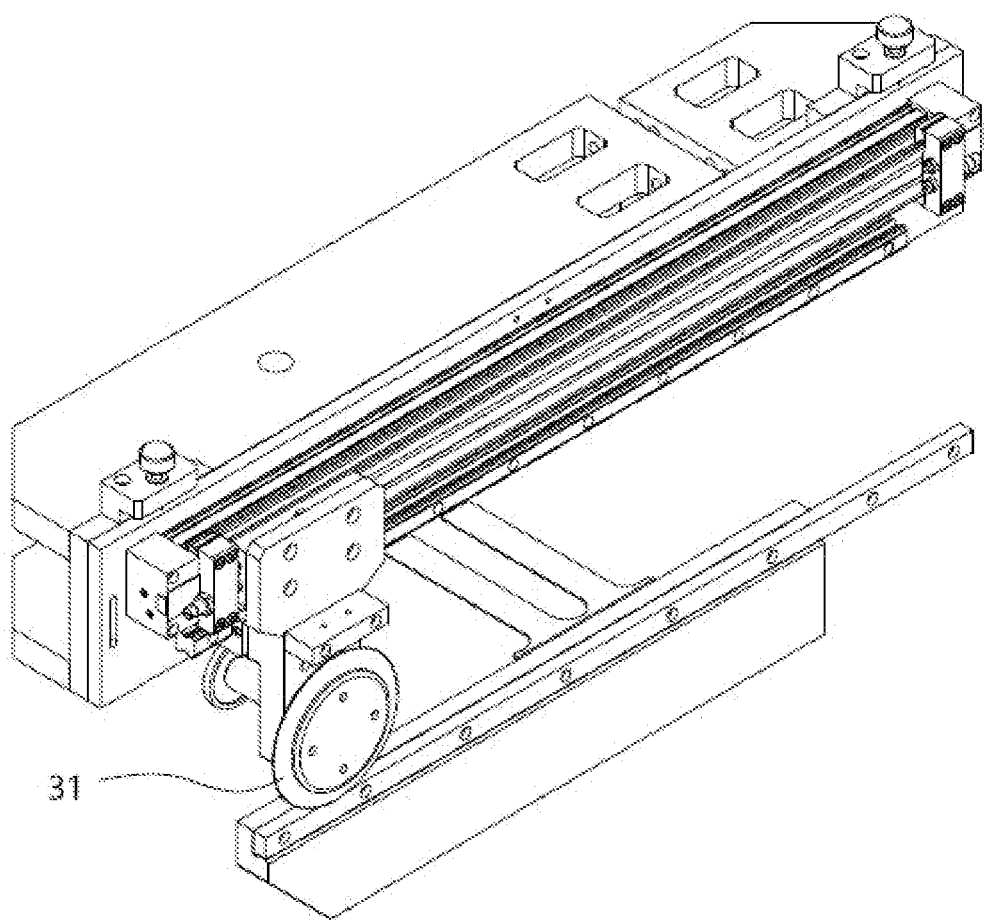
FIG. 2 is a photograph of a lithium foil cutter according to the present invention.

FIG. 2 is a detailed photograph of the lithium foil cutter, wherein a circular wheel 31 moves back and forth and cuts the lithium foil while rotating.

The lithium foil is sticky and the lithium metal stain the blade of the wheel, or the cut section is not sharply cut, so the wheel must be replaced periodically. The lithium foil cutter of the present invention uses a lubricant coater to apply lubricant to the lithium foil first and cuts it with the wheel when the wheel advances, so that the lithium metal does not stain on the blade of the wheel and the life of the blade can be extended.

Figure 3:
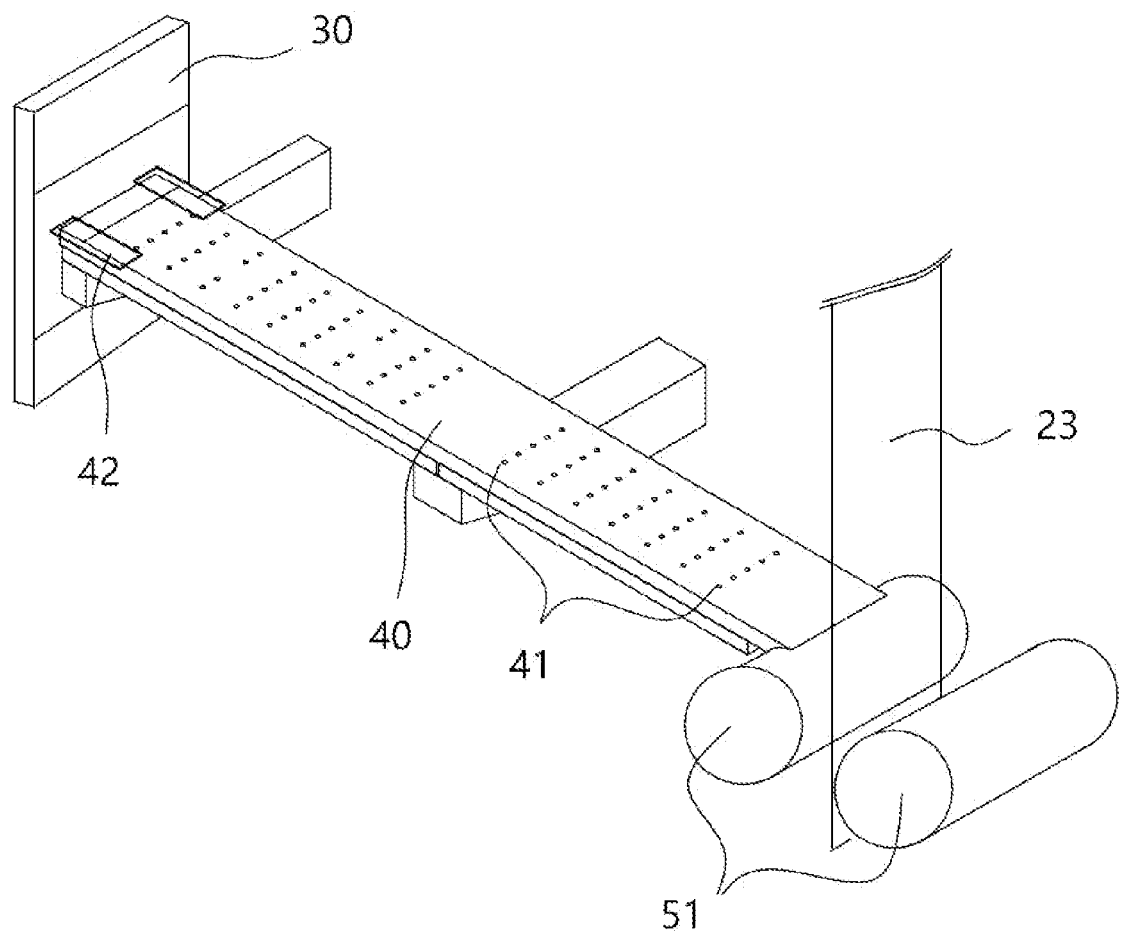
FIG. 3 is a photograph of a guide plate according to the present invention.

The guide plates 40, 40' guide the cut lithium foil to the guide rolls 51. A plurality of suction holes 41 are formed in the guide plate as shown in FIG. 3 to prevent the cut lithium foil by a weak vacuum adsorption force from being disturbed or moved.

One end of the lithium foil is transferred to the guide rolls 51 using a gripper 42, and a vacuum of the guide plates is released during transfer, but the vacuum is held when the transfer is completed.

Figure 4:
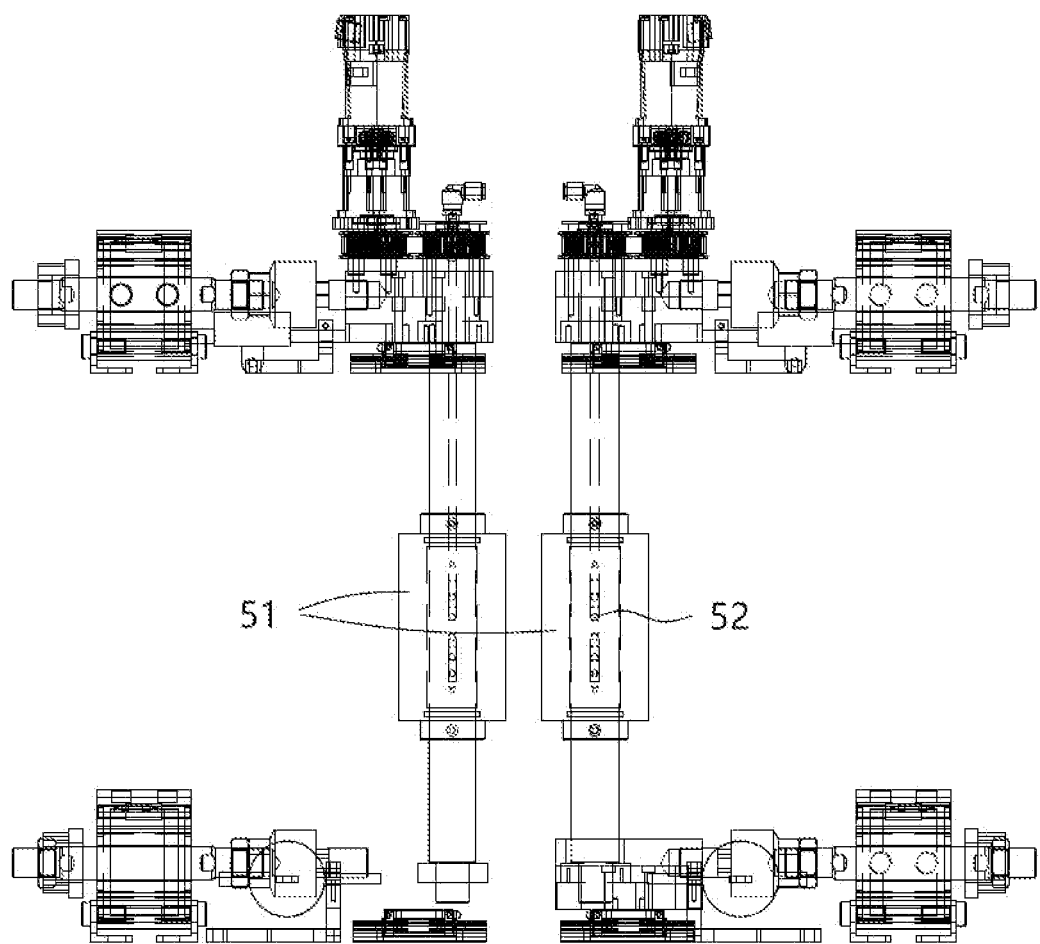
FIG. 4 is a perspective view of a guide rolls according to the present invention.

FIG. 4 is a perspective view of the guide rolls 51, a patterned copper foil 23 passes through the center, and guide plates to the press roll in order to laminate the cut lithium foil on both sides of the copper foil according to the pattern of the copper foil.

A pair of synthetic resin rolls are used for guide rolls and formed with a plurality of suction holes 52. When the cut lithium foil is transferred to the suction holes with a gripper, the vacuum force of the guide rolls sucks the cut lithium foil, attaches it to the copper foil slightly, and lowers it, then releases vacuums at the final stage so that the end of the lithium foil falls on the press rolls 53 and proceeds. When attaching the cut lithium foil to the copper foil, if both one end and the other end are attached, air bubbles cannot escape during the compression process by the press roll, resulting in defective products.

In the present invention, a roll made of synthetic resin is used as a guide roll so that the lithium foil does not stick. Synthetic resin rolls are required to have mechanical strength and high surface tension, so that lithium foil does not stick well. In the present invention, acetal is used for a synthetic resin roll, which is easy to process, has a high tensile and bending strength, an abrasion resistance and dimensional stability, and has a high surface tension.

Figure 5:
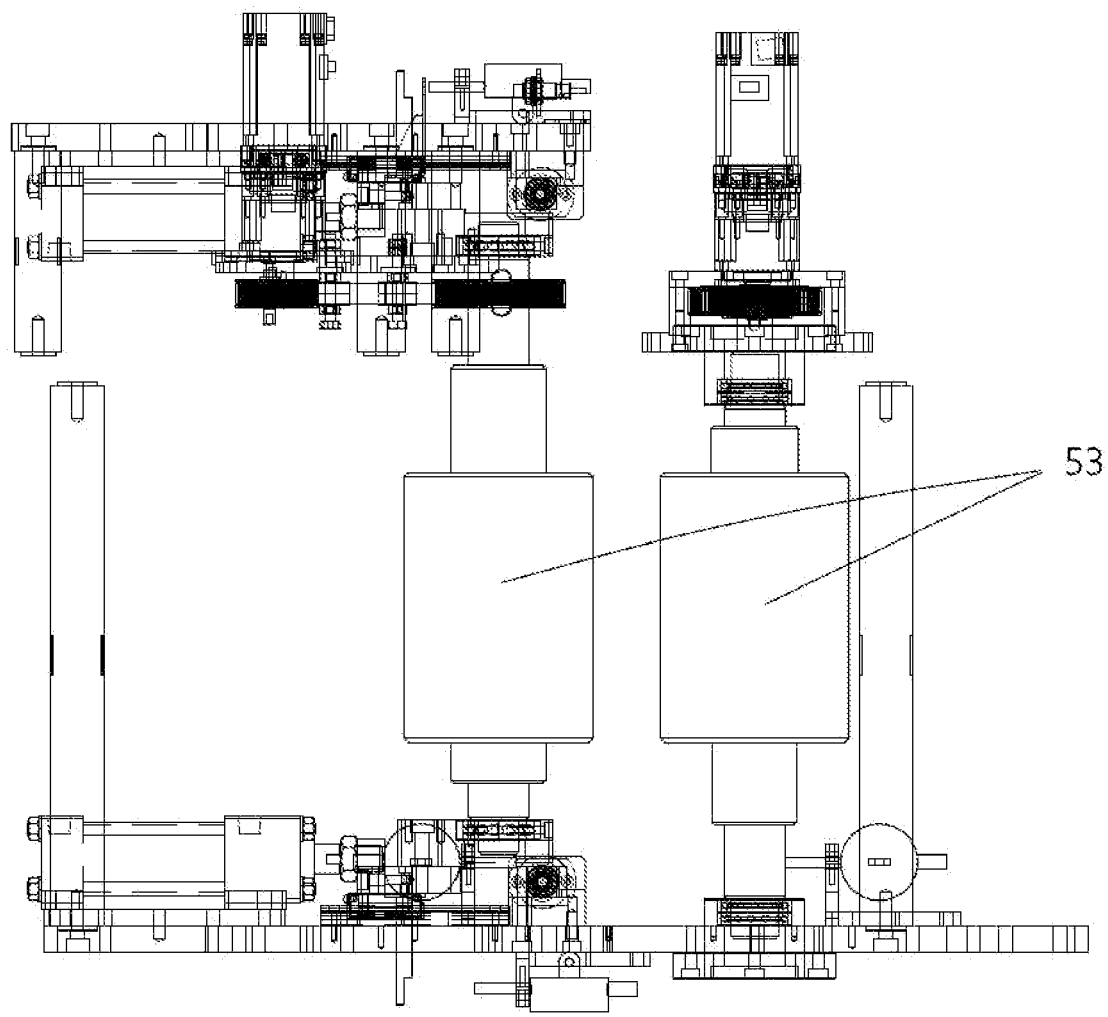
FIG. 5 is a perspective view of a press roll according to the present invention.

FIG. 5 is a perspective view of a pair of press rolls 52 for laminating the lithium foil to the copper foil. One of the pair of press rolls is a steel roll and the other is a synthetic resin roll. When both steel rolls are used, there is a problem in productivity due to the occurrence of defective products such as lithium foil sticking and tearing.

Synthetic resin rolls are required to have mechanical strength and high surface tension, so that lithium foil does not stick well. In the present invention, acetal is used for a synthetic resin roll, which is easy to process, has high tensile and bending strength, abrasion resistance and dimensional stability, and has a high surface tension.

The first release film unwinder 60 provides the release film so that the laminated anode materials do not stick to each other.

The second release film unwinder 61, 63 unwinds the release film so as to wrap the press roll surface for compressing the cut lithium foil, and then winds it again with the winders 62, 64. The release film prevents lithium foil from sticking to the press roll and also cleans the press roll adsorbed foreign substances.

The anode material winding machine 70 winds up the anode material to which the release film is attached.

What is claimed is:

1. A lithium foil lamination apparatus for an anode material of a lithium metal battery, comprising:
   a pair of lithium foil unwinders for unwinding lithium foils wound together with release films;
   a pair of tension guide rolls for minimizing tension fluctuations of unwound lithium foils;
   a pair of horizontal guide rolls for horizontally guiding the unwound lithium foils passed through the pair of tension guide rolls;
   a pair of first release film winders for winding release films removed from the lithium foil unwinders;
   a copper foil unwinder for unwinding a patterned current collector;
   a copper foil tension regulator for changing a direction downward by adjusting a tension of an unwound copper foil;
   a pair of lithium foil cutters for cutting the lithium foils that have passed through the horizontal guide rolls to a predetermined length;
   a pair of guide plates for guiding cut lithium foils to a pair of guide rolls, the pair of guide rolls for guiding the cut lithium foils on both sides of a patterned copper foil;
   a pair of press rolls for laminating the cut lithium foils to both sides of the patterned copper foil;
   a first release film unwinder for inserting a release film into a laminated anode material; and
   an anode material winder for winding the laminated anode material into which the release film is inserted,
   wherein the lithium foil unwinders, the tension guide rolls, the horizontal guide rolls, the first release film winders, the lithium foil unwinders, the lithium foil cutter, the guide plates, the guide rolls and the press rolls are formed symmetrically left and right in pairs,
   and the pair of guide rolls and the pair of press rolls are a two-stage structure with guide rolls formed on an upper part.

2. The lithium foil lamination apparatus as claimed in claim 1, wherein the pair of lithium foil cutters includes a lubricant coater.

3. The lithium foil lamination apparatus as claimed in claim 1, wherein a plurality of suction holes is formed in the guide plate.

4. The lithium foil lamination apparatus as claimed in claim 1, wherein the pair of guide rolls is formed of a synthetic resin.

5. The lithium foil lamination apparatus as claimed in claim 1, wherein a plurality of suction holes is formed in each of the pair of guide rolls.

6. The lithium foil lamination apparatus as claimed in claim 1, wherein one of the pair of press rolls is a steel roll and the other is a synthetic resin roll.

\* \* \* \* \*